(12) United States Patent
Zanaroli

(10) Patent No.: US 11,049,196 B2
(45) Date of Patent: Jun. 29, 2021

(54) DRIVE-THROUGH AUTOMATED SUPERMARKET

(71) Applicant: Datalogic I.P. Tech S.R.L., Lippo di Calderara de Reno (IT)

(72) Inventor: Matteo Zanaroli, San Lazzaro di Savena (IT)

(73) Assignee: Datalogic I.P. Tech S.R.L., Bologna (IT)

(*) Notice: Subject to any disclaimer, the term of this patent is extended or adjusted under 35 U.S.C. 154(b) by 178 days.

(21) Appl. No.: 16/235,938

(22) Filed: Dec. 28, 2018

(65) Prior Publication Data

US 2020/0211130 A1 Jul. 2, 2020

(51) Int. Cl.
| | |
|---|---|
| *G06Q 30/00* | (2012.01) |
| *G06Q 50/10* | (2012.01) |
| *G08G 1/017* | (2006.01) |
| *B60L 53/60* | (2019.01) |
| *B62D 65/18* | (2006.01) |

(Continued)

(52) U.S. Cl.
CPC .............. *G06Q 50/10* (2013.01); *A47F 9/04* (2013.01); *B60L 53/60* (2019.02); *B62D 65/18* (2013.01); *B65G 1/065* (2013.01); *B65G 1/1375* (2013.01); *G05B 19/045* (2013.01); *G05B 19/054* (2013.01); *G06K 7/00* (2013.01); *G06K 17/0029* (2013.01); *G06Q 10/087* (2013.01); *G06Q 20/18* (2013.01); *G06Q 30/0635* (2013.01);

(Continued)

(58) Field of Classification Search
CPC ...... G06Q 30/0601–0645; G06Q 50/10; B60L 53/60; A47F 9/04; B62D 65/18; G05B 19/045; G05B 19/054; G06K 7/00
USPC .............................................. 705/26.1–27.2
See application file for complete search history.

(56) References Cited

U.S. PATENT DOCUMENTS 7,054,832 B1 5/2006 Vallabh
8,615,439 B2 12/2013 Ramaratnam et al.
(Continued)

FOREIGN PATENT DOCUMENTS

RU 0002428364 C1 9/2011

OTHER PUBLICATIONS

Malykhina, Elena. "One-Stop Shop from Your Car." InformationWeek. 1091 (2006): 21. ProQuest. (Year: 2006).*

(Continued)

*Primary Examiner* — Resha Desai
*Assistant Examiner* — Kennedy Gibson-Wynn

(57) ABSTRACT

A store is described, including an ordering interface, a storage area, automated vehicles, and a central processing system. The ordering interface accepts selections of items for purchase from a shopper. The storage area, stocking items for sale, is separate from the area containing the ordering interface. The automated vehicles retrieve items from the storage area. The central processing system is configured to: check-in the shopper; assign an order fulfilment module to the shopper; receive selections of items from the ordering interface in real-time, as the shopper selects the items for purchase; send the selections to the order fulfilment module for retrieval in real-time; check-out the shopper when the shopper is finished selecting items; and arrange delivery of the completed order to the shopper. The order fulfilment module assigns automated vehicles to retrieve the items for purchase in real-time. A method for operating a store is also described.

20 Claims, 6 Drawing Sheets

(51) Int. Cl.
*B65G 1/137* (2006.01)
*B65G 1/06* (2006.01)
*G06Q 30/06* (2012.01)
*A47F 9/04* (2006.01)
*G05B 19/05* (2006.01)
*G05B 19/045* (2006.01)
*G06K 7/00* (2006.01)
*G06K 17/00* (2006.01)
*H04L 29/08* (2006.01)
*G06Q 20/18* (2012.01)
*G06Q 10/08* (2012.01)
*G07G 1/12* (2006.01)

(52) U.S. Cl.
CPC .......... *G08G 1/017* (2013.01); *H04L 67/125* (2013.01); *B65G 2203/04* (2013.01); *G07G 1/12* (2013.01)

(56) References Cited

U.S. PATENT DOCUMENTS

| | | | |
|---|---|---|---|
| 8,793,588 | B2 | 7/2014 | DiPietro |
| 8,972,045 | B1 | 3/2015 | Mountz et al. |
| 9,505,559 | B1 | 11/2016 | Cai |
| 9,582,792 | B2 | 2/2017 | Bonk et al. |
| 10,373,226 | B1* | 8/2019 | Russell ............. G06Q 30/0613 |
| 2007/0265769 | A1* | 11/2007 | Geelen ................... G01C 21/00 701/200 |
| 2012/0150683 | A1 | 6/2012 | Herrington |
| 2013/0006776 | A1 | 1/2013 | Miller et al. |
| 2014/0365273 | A1 | 12/2014 | Hurewitz |
| 2016/0034879 | A1 | 2/2016 | Dar |
| 2016/0063604 | A1 | 3/2016 | Shaffer et al. |
| 2016/0117756 | A1 | 4/2016 | Carr et al. |
| 2016/0257212 | A1* | 9/2016 | Thompson ............ G01S 1/7034 |
| 2016/0259329 | A1* | 9/2016 | High .................... G01S 1/7038 |
| 2017/0178257 | A1 | 6/2017 | Tingler et al. |
| 2017/0180012 | A1 | 6/2017 | Tingler et al. |
| 2018/0043533 | A1* | 2/2018 | Johnson ............... G05D 1/0297 |
| 2018/0082356 | A1* | 3/2018 | Wilkinson .......... G06Q 10/087 |
| 2018/0127211 | A1 | 5/2018 | Jarvis et al. |
| 2018/0134492 | A1* | 5/2018 | Lert, Jr. ............ G06Q 30/0643 |
| 2018/0164818 | A1* | 6/2018 | Wilkinson ............. G05D 1/088 |
| 2018/0276739 | A1* | 9/2018 | Chopp ............... G06Q 30/0631 |

OTHER PUBLICATIONS

Linder, Courtney. "Warehouse Robotics Startup is Hiring Berkshire Grey Has Been Quietly Building Products To Help Amazon's Competitors—Now It Hopes To Double Its Pittsburgh Staff." Pittsburgh Post—Gazette Dec. 12, 2018: B. ProQuest. (Year: 2018).*
Non-patent literature available at www.hngn.com/articles/169778/20160114/drive-through-supermarkets-revolutionize-grocery-shopping.htm, entitled "Drive Through Supermarkets Could Revolutionize Grocery Shopping," Jan. 14, 2016, 3 pages.

* cited by examiner

DRIVE-THROUGH AUTOMATED SUPERMARKET

BACKGROUND

Field of the Invention

The present invention relates to an automated store with real-time retrieval of items selected by a shopper. Examples are given of such a store configured as an automated drive-through supermarket.

Description of the Related Art

Retail establishments, such as fast-food restaurants, having drive-through ordering and delivery have existed for decades. For stores, such as supermarkets, such drive-up service is more recent, and is currently typically implemented using on-line ordering and payment, with drive-up delivery of ordered goods. In a typical store of this type, the shopper enters an order from a personal computer or other Web-enabled device, completes the order, and pays for the order. The store then sets a time when the order will be ready for pick-up, fulfils the order, and (hopefully) has the completed order ready by the time that the shopper arrives to pick-up the order. In some of these stores, the goods are kept in a storage facility, and may be retrieved in an automated or semi-automated manner after the order has been entered.

Many fast food restaurants have also recently been adopting use of ordering kiosks, where diners can enter an order at an automated kiosk. Once the order is entered, employees of the restaurant prepare and assemble the order, which can then be picked up by the diner, or delivered to his or her table.

What is needed is a store, such as a supermarket, that offers a more complete drive-through shopping experience. Such a store should handle identifying the shopper, accepting an order entered at the store by the shopper, accepting payment, rapid and automated order fulfilment, and fast delivery to the shopper vehicle. All of this should preferably be done without requiring that the shopper leave his or her vehicle.

SUMMARY

Technologies are described for a store including an item ordering interface, an item storage area, a plurality of automated vehicles, and a central processing system. The item ordering interface is configured to present information on items for sale to a shopper, and to accept selections of items for purchase from the shopper. The item storage area is separate from an area containing the item ordering interface for stocking the items for sale. The plurality of automated vehicles are configured to move within the item storage area and to retrieve items from the item storage area. The central processing system is configured to: check-in the shopper; assign an order fulfilment module to the shopper; receive selections of items for purchase from the item ordering interface in real-time, as the shopper selects the items for purchase; send the selections of items for purchase to the order fulfilment module for retrieval from the item storage area in real-time, as the shopper selects the items for purchase; check-out the shopper when the shopper is finished selecting items for purchase, a final selection of items for purchase forming a completed order; and arrange delivery of the completed order to the shopper after the order fulfilment module has finished retrieval of the items for purchase in the completed order. The order fulfilment module is configured to assign one or more of the automated vehicles to retrieve the items for purchase in real-time, as the shopper selects the items for purchase.

In another aspect, a method of operating a drive-through store includes: checking-in a shopper when the shopper drives a shopper's vehicle through a check-in portal; assigning an available drive-up kiosk to the shopper when the shopper is checked-in; directing the shopper's vehicle to the assigned drive-up kiosk; presenting an item ordering interface on the assigned drive-up kiosk, the item ordering interface presenting information on items for sale to the shopper, and accepting selections of items for purchase from the shopper; assigning, by a central processing system, an order fulfilment module to the shopper; receiving, by the central processing system, selections of items for purchase from the item ordering interface in real-time, as the shopper selects the items for purchase; sending, by the central processing system, the selections of items for purchase to the order fulfilment module for retrieval from an item storage area in real-time, as the shopper selects the items for purchase; assigning, by the order fulfilment module, one or more automated vehicles located in the item storage area to retrieve the items for purchase in real-time, as the shopper selects the items for purchase; checking-out the shopper when the shopper is finished selecting items for purchase, a final selection of items for purchase forming a completed order; and delivering the completed order to the shopper's vehicle after the order fulfilment module has finished retrieval of the items for purchase in the completed order.

DETAILED DESCRIPTION

Figure 1:
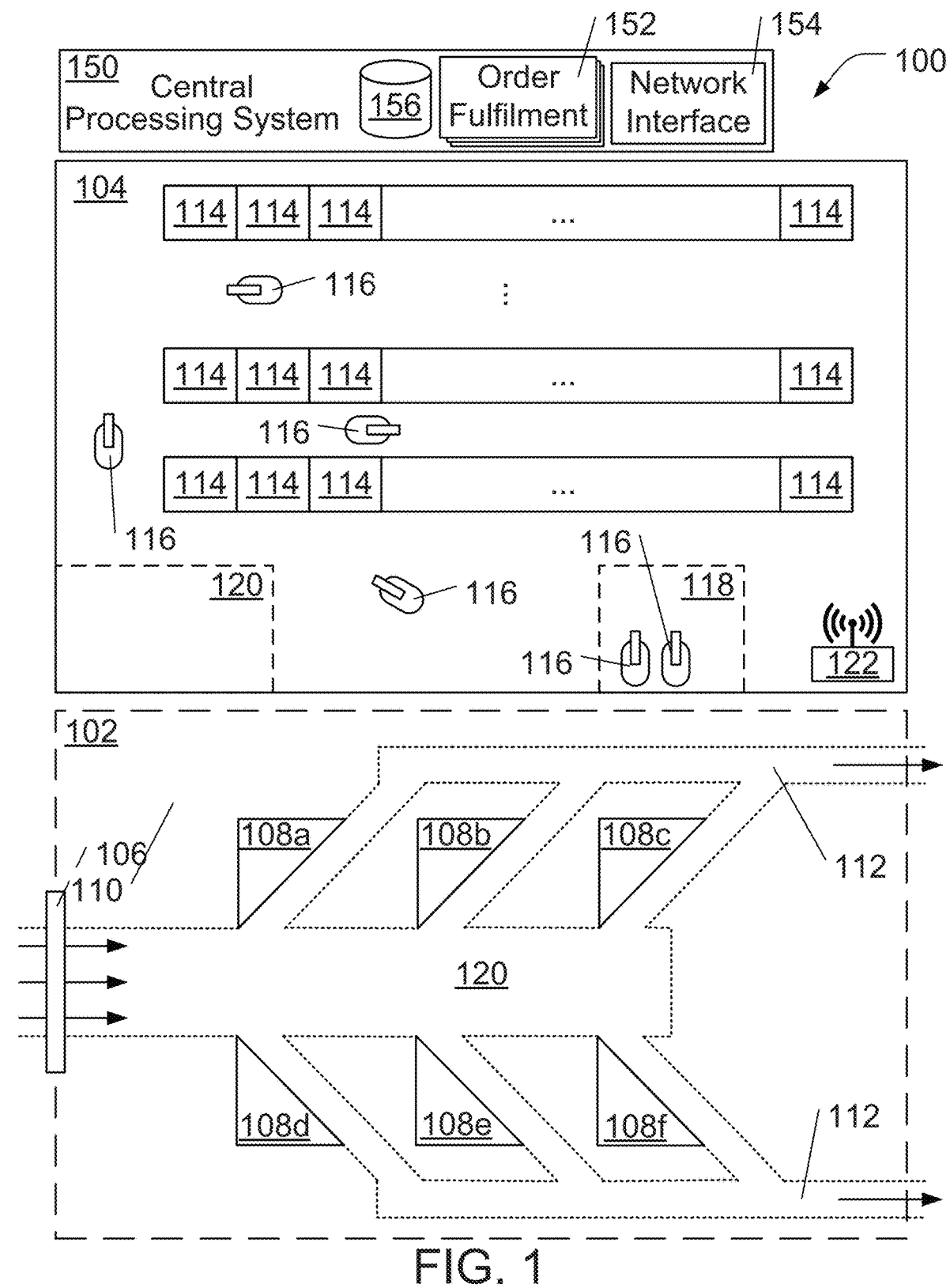
FIG. 1 shows aspects of an example of an automated drive-through store.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disclosed herein is a store including an item ordering interface, an item storage area, a plurality of automated vehicles, and a central processing system. The item ordering interface is configured to present information on items for sale to a shopper, and to accept selections of items for purchase from the shopper. The item storage area is separate from an area containing the item ordering interface, for stocking the items for sale. The plurality of automated vehicles are configured to move within the item storage area and to retrieve items from the item storage area. The central processing system is configured to: check-in the shopper; assign an order fulfilment module to the shopper; receive selections of items for purchase from the item ordering interface in real-time, as the shopper selects the items for purchase; send the selections of items for purchase to the order fulfilment module for retrieval from the item storage area in real-time, as the shopper selects the items for purchase; check-out the shopper when the shopper is finished selecting items for purchase, a final selection of items for purchase forming a completed order; and arrange delivery of the completed order to the shopper after the order fulfilment module has finished retrieval of the items for purchase in the completed order. The order fulfilment module is configured to assign one or more of the automated vehicles to retrieve the items for purchase in real-time, as the shopper selects the items for purchase.

In another aspect, a method of operating a drive-through store includes: checking-in a shopper when the shopper drives a shopper's vehicle through a check-in portal; assigning an available drive-up kiosk to the shopper when the shopper is checked-in; directing the shopper's vehicle to the assigned drive-up kiosk; presenting an item ordering interface on the assigned drive-up kiosk, the item ordering interface presenting information on items for sale to the shopper, and accepting selections of items for purchase from the shopper; assigning, by a central processing system, an order fulfilment module to the shopper; receiving, by the central processing system, selections of items for purchase from the item ordering interface in real-time, as the shopper selects the items for purchase; sending, by the central processing system, the selections of items for purchase to the order fulfilment module for retrieval from an item storage area in real-time, as the shopper selects the items for purchase; assigning, by the order fulfilment module, one or more automated vehicles located in the item storage area to retrieve the items for purchase in real-time, as the shopper selects the items for purchase; checking-out the shopper when the shopper is finished selecting items for purchase, a final selection of items for purchase forming a completed order; and delivering the completed order to the shopper's vehicle after the order fulfilment module has finished retrieval of the items for purchase in the completed order.

As will be discussed below, a store according to the disclosure may allow stores to maintain a close relation with their customers by offering a drive-through option with automatic recognition of customers, and an easy shopping experience. The store is also highly automated, requiring fewer employees and no cashiers. Additionally, the store may have a smaller footprint than a conventional store, since there may be higher density of storage than in a conventional store, item storage may be decoupled from the purchase area, and the size of the parking area associated with the store may be reduced. Additionally, in some embodiments, which move the shopper's vehicle through the store using a conveyor system, pollution may be reduced, fuel use by the shopper may be reduced, and safety may be enhanced.

FIG. 1 depicts aspects of example of an automated drive-through store 100. The store 100 includes an ordering area 102 and a separate item storage area 104. In use, a shopper (not shown) will order items in the item ordering area 102, while items are simultaneously retrieved from the item storage area 104. The items retrieved from the item storage area 104 will be delivered to the shopper once the shopper has completed and paid for an order, and the items in the order have been retrieved. While the shopper has access to the item ordering area 102, the shopper generally has no access to the item storage area 104.

In the example shown in FIG. 1, the store is configured as a drive-through store, so that the item ordering area 102 is a drive-through area, and shoppers normally access the item ordering area 102 from within their vehicles. While the item ordering area 102 is described as being a drive-through area, it will be understood that other configurations are also possible. For example, the item ordering area 102 could allow walk-in shoppers. Techniques described herein, such as real-time automated retrieval of items selected for purchase by a shopper could also advantageously be used in other retail applications, such as rapid delivery of on-line orders.

Additionally, although the store 100 is described in various examples as a supermarket that sells food items, it will be understood that this is for purposes of illustration, and the store 100 may be most any kind of retail store, selling most any type of portable goods. Further, although the item ordering area 102 and item storage area 104 are shown as being adjacent, there are many other configurations that could be used. For example, the item ordering area 102 could be on a ground floor, and the item storage area 104 could be in an underground area, or on a higher floor of a multi-story building. The item storage area 104 could even be some distance away from the item ordering area, with continuous or frequent movement of items between the two areas for delivery of orders. The item ordering area 102 could be inside of a building or semi-enclosed structure (such as a parking structure), or could be outdoors, such as in an outdoor parking area.

The store also includes a central processing system 150, which may be located in the item storage area, or in any other area having adequate power and cooling to support one or more computer systems or servers, such as a remote data center. It will also be understood that the central processing system 150 need not be associated with only a single store 100, but could serve as the central processing system for numerous stores similar to the store 100.

The item ordering area 102 includes a check-in portal 106, and numerous ordering kiosks 108a-108f. A series of lanes 110 allow for the passage of vehicles between the check-in portal 106 and the ordering kiosks 108a-108f, and exit lanes 112 permit vehicles to move away from the ordering kiosks 108a-108f, and out of the store 100.

The item storage area 104 includes item storage units 114, automated vehicles 116, automated vehicle charging area 118, pre-loading area 120, and wireless network interface 122. The item storage units 114 may be shelves, bins, or other conventional item storage equipment. In some embodiments, some of the item storage units 114 may be temperature-controlled for the storage of refrigerated or frozen foods. In some embodiments, the item storage area 104 may include partially-enclosed temperature-controlled areas (not shown), for storage of refrigerated and/or frozen food items.

The central processing system 150 includes one or more order fulfilment modules 152, as well as a network interface 154, and a database 156. As will be discussed in greater detail below, the central processing system 150 may include a single computer or server, or numerous networked computers or servers. Order fulfilment modules 152 may be implemented in software that executes on the central processing system 150, or on other computers or servers (not shown). Similarly, the database 156 may run on the central processing system 150, or on other computers or servers (not shown).

Within the item ordering area 102, the check-in portal 106 checks a shopper into the store when the shopper drives his or her vehicle through the check-in portal 106. This check-in process may be achieved in a number of ways. In some embodiments, the check-in portal 106 may include cameras (not shown) that read the license plates of a vehicle, and use the license plate number to check-in a shopper. Alternatively, cameras in the check-in portal 106 may take images of a shopper's face, so the check-in portal 106 may use facial recognition to check-in a shopper.

In some embodiments, the shopper's vehicle may include a radio tag that can be read by RF readers (not shown) or an RFID reader (not shown) located in the check-in portal 106. Such a radio tag may be associated with the store, or may be a more general radio tag, that is also used for other purposes, such as paying road and bridge tolls. A radio tag may also be carried by a shopper, such as an RFID tag built into a store loyalty card carried by the shopper, a radio tag carried within a device (or an RF signal transmitted from a device) such as a smart phone carried by the shopper, or even an electronic tag embedded in the shopper's body. The check-in portal 106 may use such radio or RFID tags to automatically check-in a shopper when the shopper (in the shopper's vehicle) passes through the check-in portal 102.

In some embodiments, the check-in portal 106 may include a barcode scanner (not shown) that checks-in the shopper using a barcode, QR code, or other scannable code located on the vehicle, on a store loyalty card, or, e.g., on the screen of a smart phone or other device. In some embodiments, a biometric reading, such as a facial scan (as mentioned above), a fingerprint scan, or other biometric reading may be used by the check-in portal 106 to check in the shopper.

For shoppers who are not yet registered with the store, registration may be needed to check-in the shopper. In some embodiments, the check-in portal 106 may include a kiosk (not shown) for registering new shoppers. In some embodiments, new shoppers may be directed to an ordering kiosk 108a-108f for both registration and ordering.

The check-in portal 106 is in communication over a network (either wired, wireless, or both) with the central processing system 150, such that shoppers who are checked-in or registered through the check-in portal are checked-in or registered in the central processing system 150.

Once a shopper is checked-in at the check-in portal 106, the shopper is directed to use a lane 110 to navigate his or her vehicle to an open ordering kiosk 108a-108f. In some embodiments, the lane 110 may include, e.g., lights or LEDs that direct the shopper's vehicle to the open ordering kiosk 108a-108f. In some embodiments, in which the shopper's vehicle is autonomous or semi-autonomous, the shopper's vehicle may receive a signal directing the vehicle to automatically navigate to the open ordering kiosk 108a-108f. In some embodiments, the central processing system 150 may be configured to assign the open ordering kiosk 108a-108f, and to operates the lanes 110 over a network to direct shopper's vehicle. In some embodiments, one or both of these operations may be handled by local systems (not shown), which may work in coordination with the central processing system 150.

In some embodiments, the lanes 110 may include conveyors (not shown), such as conveyor belts, dual belt conveyor systems (such as are found in many automated car washes), or other conventional conveyor systems. In such systems, the shopper's vehicle may be shut down or placed in a "neutral" gear while the vehicle is automatically conveyed to the open ordering kiosk 108a-108f by the lanes 110. Advantageously, having the vehicle shut down while being conveyed to the open ordering kiosk 108a-108f, and while the shopper is ordering may save fuel, reduce air pollution, reduce the need for ventilation in an enclosed store area, and reduce the possibility of collisions or other accidents.

Once the shopper's vehicle has reached an ordering kiosk 108a-108f, the shopper may enter an order or modify a previously-entered order (e.g., such as an order that was initially entered on-line) using an item ordering interface (discussed more fully below with reference to FIG. 2). The item ordering interface presents information on items for sale to the shopper, and permits the shopper to select items for purchase. In some embodiments, the item ordering interface may be operated by the central processing system 150.

When the shopper checks-in, or alternatively when the shopper starts to select items using the item ordering interface on an ordering kiosk 108a-108f, the central processing system 150 assigns an order fulfilment module 152 to the shopper. The order fulfilment module 152 assigned to a shopper handles retrieval of the items selected by the shopper from the item storage area 104. This may be achieved by the order fulfilment module 152 communicating with one or more of the automated vehicles 116 through the network interface 154 and the wireless network interface 122. When the shopper selects an item using the item ordering interface, the order fulfilment module 152 assigns one of the automated vehicles 116 to retrieve the selected item from the item storage unit 114 in the item storage area 104. This retrieval of selected items from the item storage area 104 occurs in real-time, as the shopper continues selecting items using the item ordering interface. Advantageously, retrieving the selected items in real-time, as the shopper continues to select additional items may substantially reduce the amount of time that the shopper must wait for a completed order to be delivered to his or her vehicle.

In some embodiments, the order fulfilment module 152 assigns a single one of the automated vehicles 116 to a shopper, and that automated vehicle remains assigned to that shopper throughout the entire time that the shopper is selecting items. As the shopper continues to select items, those items are retrieved by the single assigned automated vehicle. Such an assigned automated vehicle may carry a container (not shown) associated with the shopper throughout the storage area 104, placing retrieved items directly in the container as they are retrieved. When using such a single automated vehicle assigned to the shopper, items selected by the user may be queued by the central processing system 150 and/or the order fulfilment module 152 when the shopper is selecting items faster than they are retrieved. The central processing system 150 and/or order fulfilment module 152 may route the assigned vehicle to reduce the total time to retrieve the selected items by reordering the queued selected items to prioritize retrieval of those that are closest in the item storage area 104 to the location of the assigned automated vehicle, or those that are not currently being retrieved by other automated vehicles. Once the shopper has finished with selecting items, or the container into which the items are being placed is full, the selected automated vehicle may move the container to the pre-loading area 120.

In some embodiments, the order fulfilment module 152 that is handling a particular shopper may assign more than one of the automated vehicles 116 to retrieve items selected by that shopper. As a shopper selects items, the order fulfilment module 152 assigned to that shopper selects automated vehicles 116 from those that are available and not currently assigned to other order fulfilment modules to retrieve the items that are being selected by the user. In some embodiments, one of the automated vehicles 116 may be "permanently" assigned to the shopper during the entire ordering process, while other automated vehicles 116 may be "temporarily" assigned as they are available and needed to expedite item retrieval. In some embodiments, the "temporarily" assigned automated vehicles may be selected in a way that is intended to reduce the overall item retrieval time, such as by temporarily assigning an unassigned vehicle that is nearest to the selected item that is to be retrieved.

Items that have been retrieved can be brought to a container located on the "permanently" assigned automated vehicle, or can be brought to containers that are assigned to hold the shopper's selected items. Such containers may be located in the pre-loading area 120 or at some other location in the item storage area 104. In some embodiments, there is no "permanently" assigned automated vehicle for a shopper, and the shopper's items are retrieved by "temporarily" assigned automated vehicles, which bring the retrieved items to containers that are assigned to hold the shopper's selected items. In some embodiments, there may be a set of container vehicles (not shown), each of which carries one or more containers assigned to a particular shopper, and moves to locations in the item storage area that reduce the time taken by the automated vehicles 116 to place retrieved items into a container assigned to the shopper who selected the items.

While the example shown in FIG. 1 uses automated vehicles, other automated item picking systems, such as fixed arms, or conveyers carrying items could also be used in an item storage area of an automated drive-through store.

While the shopper continues to make selections using the item ordering interface at a kiosk 108a-108f, the central system 150 and/or the order fulfilment module 152 assigned to that shopper continue to keep track of the containers and locations of items that have been retrieved for the shopper, so that the items can be removed from the containers and returned to an appropriate location in the item storage area 104 if the shopper changes his or her mind, and removes an item that has already been retrieved from the order. In some embodiments, the automated vehicles 116 may be configured to return such de-selected items to the item storage unit 114 from which the item was originally retrieved. In some embodiments, one or more of storage units 114 may be used as "de-selected item" storage units, into which a variety of de-selected items may be placed for later restocking.

In some embodiments, the automated vehicles 116 may be divided by the central processing system 150 and/or order fulfilment module 152 into an in-service set of automated vehicles (not shown) and an out-of-service set of automated vehicles (not shown). The in-service set of automated vehicles are either assigned to an order fulfilment module 152, or are available to be assigned to an order fulfilment module 152. The out-of-service set of automated vehicles are not available for assignment to an order fulfilment module 152. For example, the automated vehicles 116 may be powered by batteries. When an automated vehicle 116 detects that its battery is becoming low, it may move to the automated vehicle charging area 118, and be assigned to the out-of-service set of automated vehicles.

Once the shopper is finished selecting items for purchase, such that the shopper has created a completed order, the shopper pays for the completed order. Payment can be automatic, using a credit card, a debt card, a link to a bank account, or other payment system that is registered as part of the shopper's account. When the shopper is checked-in, the shopper's preferred payment system is retrieved, for example from the database 156, and that payment system may be automatically used to pay for the shopper's completed order. In some embodiments, the kiosks 108a-108f are configured to accept a variety of forms of payment, which may include credit cards, debt cards, cash, or other forms of payment. When the shopper has finished selecting items, and has a completed order, the kiosk at which the shopper has been entering his or her order may accept payment for the completed order from the shopper.

Once the shopper has paid for his or her completed order, the order fulfilment module 152 completes retrieving the selected items in the completed order, and one or more containers containing the selected items are either moved to or are already located in the pre-loading area 120. The central processing system 150 may then de-allocate the order fulfilment module 152 that was assigned to the shopper, and arrange for the completed order to be delivered to the shopper's vehicle. Delivery of the completed order from the pre-loading area 120 to the shopper's vehicle can be done by automated delivery vehicles or systems (not shown), store employees (not shown), or by a combination of both.

Once the order has been delivered to the shopper's vehicle, the shopper's vehicle is directed to leave the store via the exit lanes 112. In some embodiments, the exit lanes 112 may include, e.g., lights or LEDs that direct the shopper's vehicle out of the store. In some embodiments, in which the shopper's vehicle is autonomous or semi-autonomous, the shopper's vehicle may receive a signal directing the vehicle to automatically navigate out of the store. In some embodiments, the exit lanes 112 may include conveyors (not shown), such as conveyor belts, dual belt conveyor systems (such as are found in many automated car washes), or other conventional conveyor systems. In such systems, the shopper's vehicle may be shut down or placed in a "neutral" gear while the vehicle is automatically conveyed to the store exit by the exit lanes 112. As discussed above, having the vehicle shut down while being conveyed to the store exit may save fuel, reduce air pollution, reduce the need for ventilation an enclosed store area, and reduce the possibility of collisions or other accidents.

Figure 2:
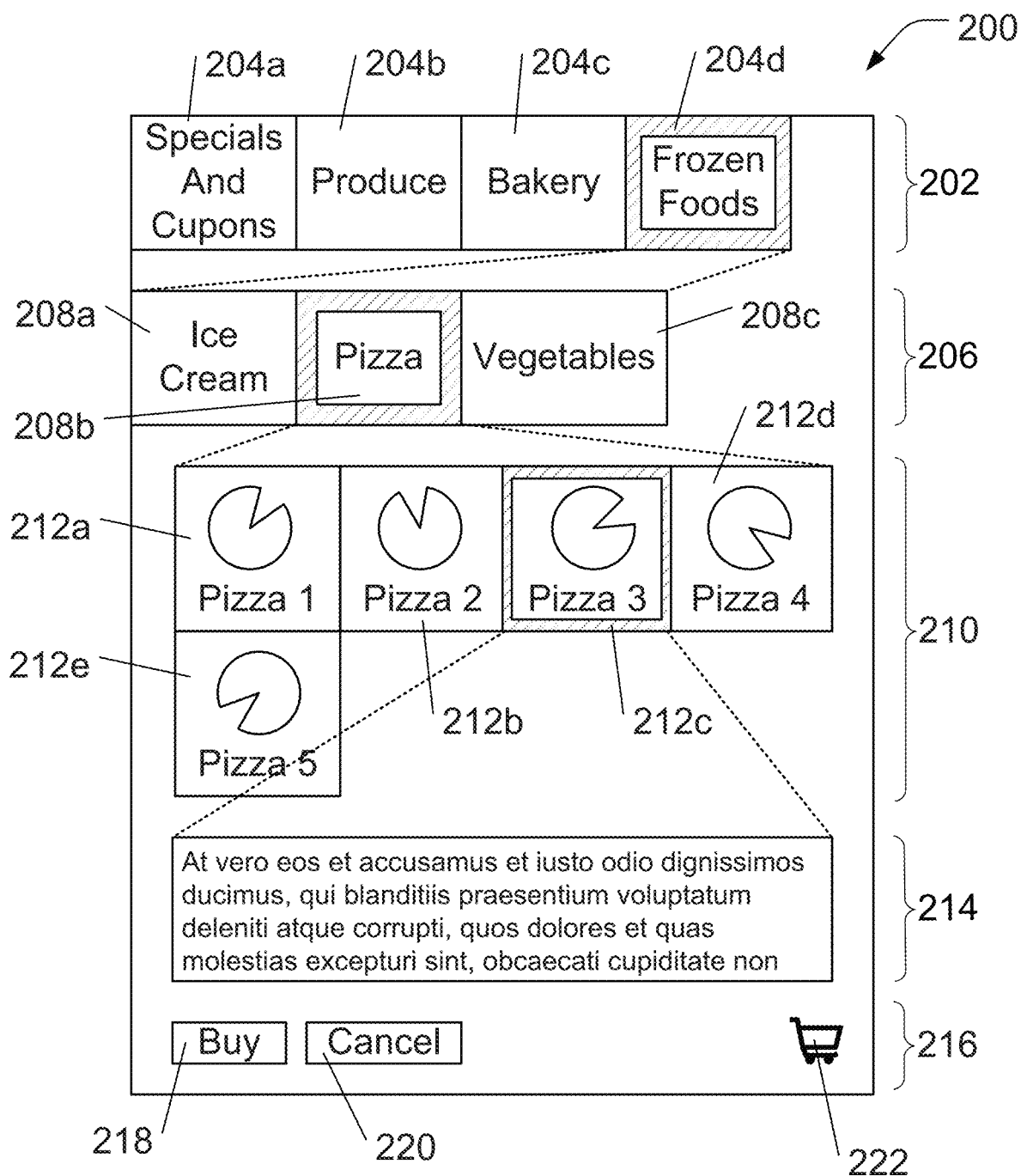
FIG. 2 shows aspects of an example of an item ordering interface for use in an automated drive-through store.

FIG. 2 shows an example of an item ordering interface 200 that, as discussed above, may be displayed on a screen, such as a touch-screen, on a kiosk such as kiosks 108a-108f (as shown in FIG. 1). The item ordering interface 200 includes a main menu area 202, having main menu items 204a-204d, a sub-menu area 206, including sub-menu items 208a-208c, an item selection area 210, including images of items 212a-212e, an item information display area 214, and a command area 216, which may contain command buttons, such as a "buy" button 218, a "cancel" button 220, and a "view cart" button 222. If there are too many items to display in any of these areas, the areas may be scrolled in either a vertical or a horizontal direction, or both.

Using an item ordering interface for a supermarket as an example, the main menu area 202 may include main menu items 204a-204d such as a "specials and coupons" item 204a, a "produce" item 204b, a "bakery" item 204c, and a "frozen foods" item 204d. It will be understood that the actual item ordering interface for a supermarket would include numerous other main menu items, and that main menu items 204a-204d are only examples.

In the example item ordering interface 200, the "frozen foods" main menu item 204d has been selected. This causes the display of numerous sub-menu items 208a-208c in the sub-menu area 206. For example, under the "frozen foods" main menu item 204d, there may be sub-menu items such as "ice cream" item 208a, "pizza" item 208b, and "vegetables" item 208c. As above, these are merely examples of sub-menu items 208a-208c, and for any given main menu item 204a-204d, there may be a different number of sub-menu items, and the sub-menu items may be different than those that are shown.

In the example shown, the "pizza" item 208b has been selected by the shopper, so that the item selection area 210 is displaying numerous frozen pizzas that are available for purchase as images of items 212a-212e. In the example shown, the frozen pizza displayed as image of item 212c is selected, so information on the particular frozen pizza shown in the image of item 212c is displayed in the information display area 214.

In some embodiments, the information display area 214 may include links (not shown) that can be selected by the shopper. These may include links to cause the interface to show additional views of the selected item, links to display ingredients, potential allergens or nutritional information, links to show related items, links to show or download recipes using the selected item, and so on.

The command area 216 includes various context-specific commands that may be used by the shopper. For example, since the frozen pizza shown in image of item 212c is displayed, if the shopper selects the "buy" button 218, the item would be selected for inclusion in the shopper's order. If the shopper is making the selection from, e.g., the ordering area 102 of the store 100 shown in FIG. 1, when the shopper selects the "buy" button, an order fulfilment module 152 will immediately start the process of retrieving the item from the item storage area 104. If the shopper selects the "cancel" button 220, then the interface 200 may cancel the current selections.

If the shopper selects the "view cart" button 222, the ordering interface 200 will display the items that are currently in the user's shopping cart (not shown). In some embodiments, the shopping cart display may include information on the retrieval status of the items in the cart, and may provide retrieval time estimates for retrieval of selected items that have not yet been retrieved.

In the example ordering interface 200, selection is handled via a touch screen. It will be understood that other selection mechanisms, such as a mouse, trackball, keypad, hand motion tracking, eye tracking, or other input devices could be used to select items in an ordering interface such as the example ordering interface 200. It will also be recognized that many other layouts of menus or buttons could be used, and that the example ordering interface 200 represents only one example.

While the ordering interface 200 is described as being displayed on the screen of a kiosk, such as kiosks 108a-108f of FIG. 1, it will be understood the same or a similar ordering interface could be displayed on other devices or in other locations. For example, the ordering interface 200 may be displayed on a home computer or tablet, for entering pre-orders to be picked up at the store 100 (as shown in FIG. 1). Alternatively, even while the shopper is located at the store 100, orders could be entered through a similar ordering interface displayed on a personal device carried by the shopper, such as a smart phone, or on a display screen or heads-up display located in the shopper's vehicle.

Figure 3:
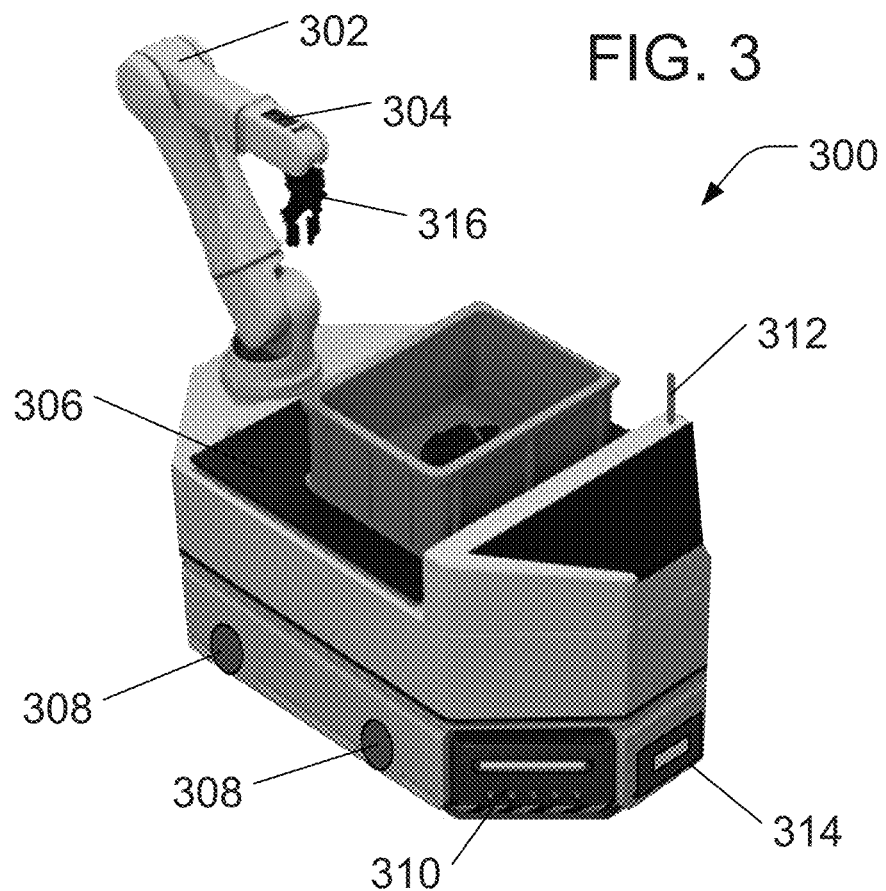
FIG. 3. shows aspects of an example of an automated vehicle for use in retrieving items in an item storage area of an automated drive-through store.

FIG. 3 shows an automated vehicle 300, which is similar to the automated vehicles 116 that operate within the item storage area 104, as shown in FIG. 1. The automated vehicle 300 includes a manipulator 302, a sensor 304, a container space 306, a drive system 308, a user interface 310, a wireless network interface 312, and a charging port 314.

The manipulator 302 may be a conventional medium payload manipulator arm, ending in an end effector 316, such as a mechanical gripper (as shown) or a suction cup driven by a vacuum pump (not shown). The end effector 316 enables the manipulator 302 to pick up items. For example, the manipulator 302 may be used to pick items off of shelves and place them into a container located in the container space 306.

The sensor 304, which is shown here near an end of the manipulator 302, may be a camera or other sensor system for sensing items, or may be a combination of sensors, such as a combination of a camera and an RFID reader for reading RFID tags associated an item. In operation, the sensor 304 may identify an object to be picked by reading an associated barcode, or through a vision algorithm that compares images of items to be picked with images of the items retrieved from a database, or through other sensors, such as by reading an RFID tag.

The container space 306 provides an area in which a bag, box, or other container may be placed for collecting items. For example, once the manipulator 302 picks an item from a shelf, the item may be placed in a box located in the container space 306, the box containing items in a shopper's order.

The drive system 308 is used to move the automated vehicle 300 within an item storage area. The drive system 308 may include drive wheels, as shown in FIG. 3, or may include other conventional drive systems, such as tracks or robotic legs.

The user interface 310 provides information on the current state of the automated vehicle 300, and may also include controls, such as an emergency stop switch. The user interface 310 may also include warning systems, such as an audible alarm to indicate that the automated vehicle 300 has encountered a problem, or an audible "horn" to warn humans working in an item storage area of the approach of the automated vehicle 300.

The wireless network interface 312 is used to receive commands from the central processing system and/or from an order fulfilment module. For example, the automated vehicle 300 may receive updates on the items selected by a shopper and to be collected via the wireless network. In some embodiments, the automated vehicle 300 may also receive route information from the central processing system through the wireless network interface 312.

In the embodiment shown in FIG. 3, the automated vehicle 300 is powered by an internal battery (not shown), which may need to be periodically recharged. The automated vehicle 300 may connect itself to a power source to recharge its battery through the charging port 314.

The automated vehicle 300 is operated by one or more internal processors (not shown) and internal memory (not shown) for use by the processors in controlling the automated vehicle 300. These internal processors may control the movement of the automated vehicle 300, the manipulator 302, and other functions of the automated vehicle 300. The internal processors may also implement an indoor navigation system, based for example on the acquisition of images presenting indicia related to the specific position on the ground or on the vertical structures. Other conventional navigation systems, such as navigation systems based on received RF signals, could also be used.

The automated vehicle 300 may also include internal non-volatile memory (not shown), which may store programs to be executed by the internal processors, and may also store other useful information. For example, in some embodiments, the internal non-volatile memory may store layout information on the item storage area. The automated vehicle 300 may dynamically receive the position of a new item to retrieve, and may compute the best route to the item using layout information on the item storage area stored in the internal non-volatile memory.

It will be understood that other configurations of the automated vehicle 300 may be used. For example, an automated vehicle may include systems for adjusting height, multiple manipulators, different drive systems, different locations for manipulators, etc. The design of the automated vehicle 300 may depend on the design and layout of the item storage area in which it is to be used.

Figure 4:
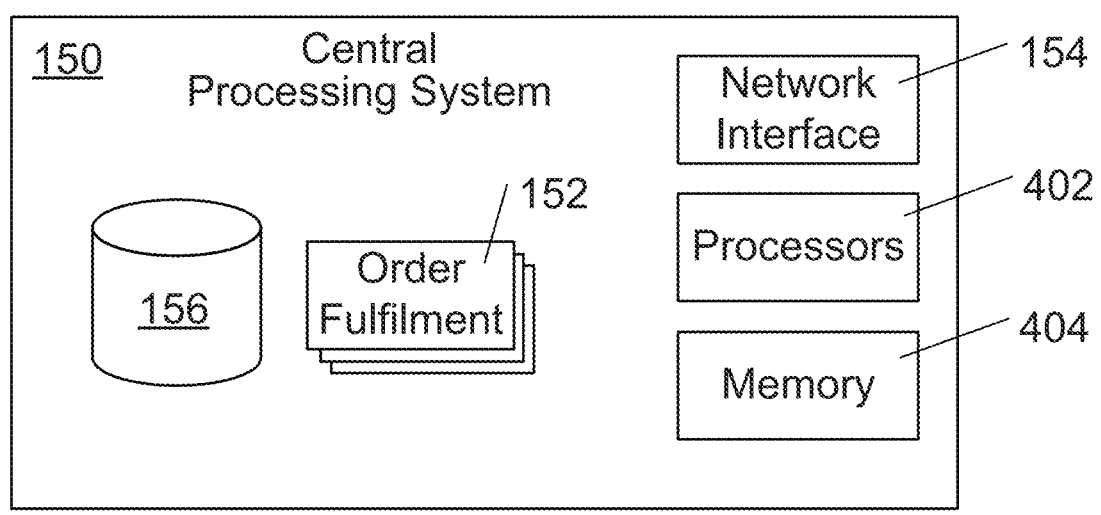
FIG. 4 shows aspects of an example of a central processing system for operating an automated drive-through store.

FIG. 4 is a block diagram of one embodiment of the central processing system 150. As discussed above, the central processing system 150 controls the operation of one or more stores. The central processing system 150 includes one or more processors 402, which execute the computation and processes on the central processing system 150. The central processing system also includes a memory 404, for use by the processors 402, and for storing programmed commands to be performed by the processors 402. The memory 404 may include both volatile and non-volatile memory. The central processing system also includes a network interface 154, a database 156, and one or more order fulfilment modules 152.

The central processing system 150 may be a single computer or server, or may be made up of numerous computers or servers, communicating over a network (e.g., through the network interface 154). In embodiments in which the central processing system is made up of numerous computers or servers, each such computer or server may include one or more processors 402, a memory 404, and a network interface 154.

The central processing system 150 may handle a wide variety of tasks for one or more stores. For example, the central processing system may operate the item ordering interfaces that are shown on kiosks in the store, as well as serving web-based ordering and ordering on apps that execute on personal devices. The central processing system 150 may also track the inventory available in the item storage areas of one or more stores, and keep track of the locations of items stocked in the item storage areas. The central processing system 150 may also handle automated recognition and check-in of shoppers, and payment for completed orders. The central processing system 150 may control lanes that direct shopper's vehicles in one or more stores, and may also control the automated vehicles that fulfil a shopper's order. These are just some of the tasks performed by the central processing system 150 in some embodiments.

In some embodiments, control is more distributed, and the central processing system 150 communicates with various other systems in one or more stores, but does not necessarily operate them. For example, in some embodiments, ordering kiosks may be operated independently from the central processing system 150, obtaining item information and stock information from the central processing system 150, and sending information on selected items to the central processing system 150, without being more fully controlled by the central processing system 150. Similarly, in some embodiments, automated vehicles may have their own navigation systems and plans of an item storage area, so that they are able to largely control themselves. Generally, many of the systems described herein for operating a store may either be performed by the central processing system 150, or may be handled in a distributed manner, by separate systems that communicate with the central processing system 150.

The database 156 may be part of the central processing system 150, running on the same computer(s) and server(s), as shown. Alternatively, the database 156 may run on separate systems or servers in communication over a network with the central processing system 150, possibly in a different physical location or datacenter than the central processing system 150.

The database 156 may be a single database or multiple databases that store a variety of information used by one or more stores. For example, the database 156 may include shopper data, including information used to identify a shopper at check-in, information on a shopper's past orders, information on a shopper's payment preferences, and so on. The database 156 may also include a variety of information on each of the items that can be purchased, including the item name, the position of the item in one or more item storage areas, the price of the item, the weight of the item, images of the item (which may include a front image, a lateral image, a back image, an upper image, and a lower image), a barcode for the item, a description of the item, nutritional facts on the item, an expiration date for the item, and other information on the item. Some of the item information, such as the item name, images, price, description, and nutritional facts may be used by the item ordering interfaces, and may be visible to shoppers. Other information, such as the position of the item in an item storage area, and the barcode of the item may be used for controlling the automated vehicles in the item storage area, and may be transmitted to the automated vehicle for retrieving the item.

The database 156 may be a conventional relational database, or another conventional database. In some embodiments, the database 156 may represent items using XML. In some embodiments, the information on items in the database 156 may be indexed using barcodes or item names.

The order fulfilment modules 152 are software modules, each of which handles item retrieval on behalf of a single shopper. In order to retrieve a shopper's items, an order fulfilment module 152 may allocate and control one or more automated vehicles in an item storage area, as described above. An order fulfilment module 152 is either assigned or instantiated for a particular shopper when the shopper checks-in to the store, or, in some embodiments, when the shopper starts selecting items using an item ordering interface on a kiosk. The order fulfilment module 152 then receives, in real-time (i.e., as the shopper continues to select items) each item selected by the shopper, and handles retrieval of the item in real-time. An order fulfilment module 152 may be deallocated when the shopper to whom the order fulfilment module 152 was assigned has completed his or her order, and the items in the completed order have been retrieved.

While the order fulfilment modules 152 are shown as part of the central processing system 150, in some embodiments, the order fulfilment modules 152 may be executed on another computer system or server, in communication with the central processing system 150.

Figure 5:
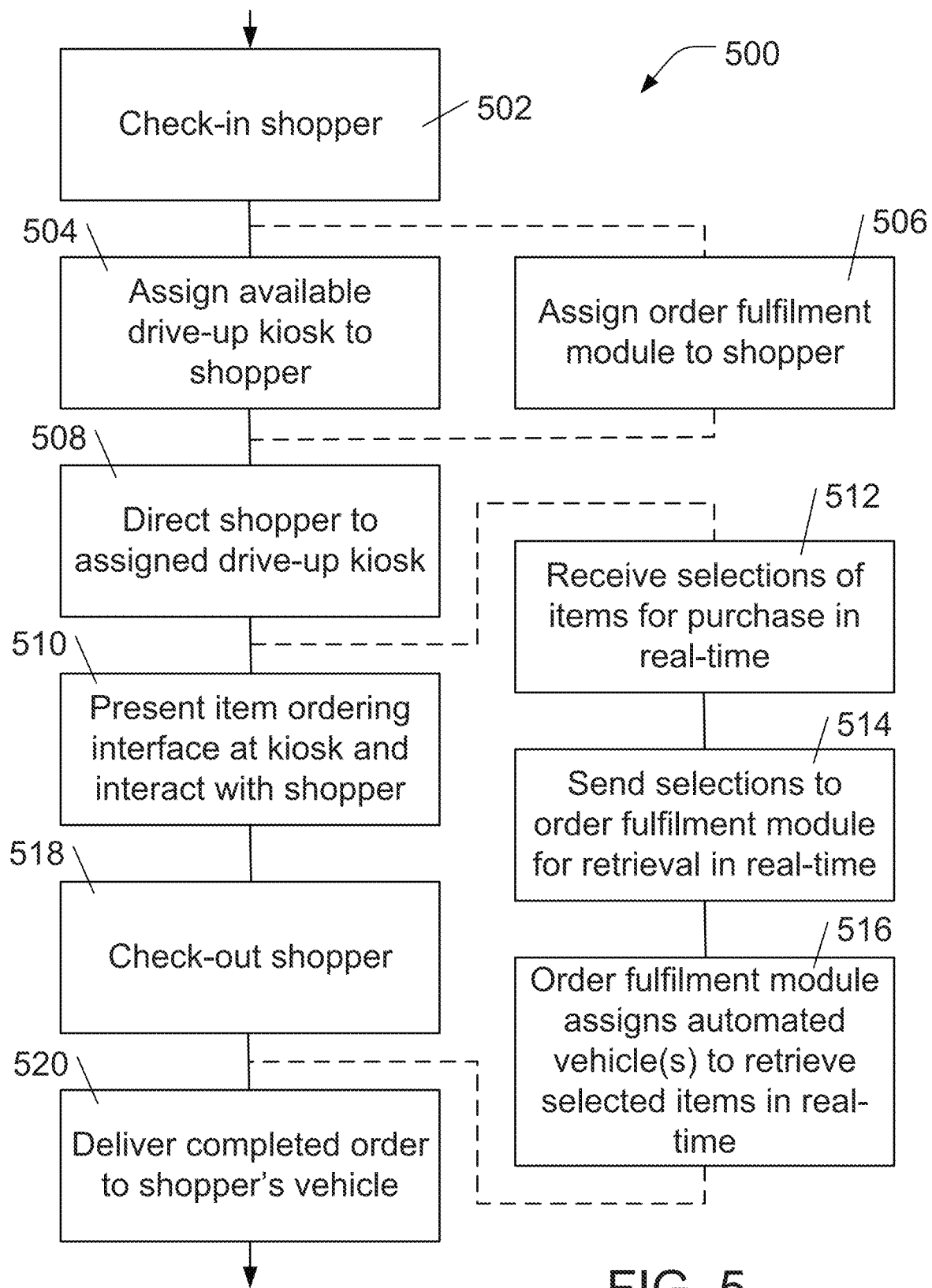
FIG. 5 shows a flow chart of aspects of a method for operating an automated drive-through store.

FIG. 5 is a flowchart 500 showing aspects of a method of operating an automated drive-through store. These aspects of operation may be performed or controlled by the central processing system 150.

At 502, a shopper is checked-in to the store when the shopper drives his or her vehicle through a check-in portal. As discussed above, this may be done automatically based on sensor information obtained by the check-in portal. This sensor information may be used to check-in the shopper by recognizing the shopper's license plate, by recognizing the shopper's face, by using a radio or RFID tag, by using a barcode, by using biometrics, or through other recognition techniques.

At 504, once the shopper is signed-in, the shopper may be assigned an available drive-up kiosk. Simultaneously or nearly simultaneously, at 506, the shopper may be assigned an order fulfilment module by the central processing system. In some embodiments, assignment of the order fulfilment module may be delayed until the shopper starts selecting items for purchase.

At 508, the shopper is directed to the assigned drive-up kiosk. As discussed above, this can be done by displaying which kiosk has been assigned, by using lights or LEDs in the lanes to direct the shopper's vehicle to the kiosk, by sending a signal that causes an autonomous or semi-autonomous vehicle to navigate to the kiosk, or through use of conveyors that automatically move the shopper's vehicle to the assigned kiosk.

At 510, once the shopper is at the assigned kiosk, an item ordering interface is presented on the kiosk. As described above, the item ordering interface interacts with the shopper to present information on items for sale to the shopper, and to accept selections of items for purchase from the shopper.

While the shopper is selecting items for purchase, at 512, the central processing system receives selections of items for purchase from the item ordering interface in real-time (i.e., as the selections are made). At 514, the central processing system sends the selections of items for purchase to the order fulfilment module that is assigned to the shopper. The order fulfilment module arranges retrieval of the selected items from the item storage area. At 516, the order fulfilment module assigns one or more automated vehicles located in the item storage area to retrieve the items. This is done in real-time, so that items are being retrieved while the shopper continues to select items for purchase.

At 518, when the shopper is finished selecting items for purchase, the shopper may check-out. This causes a completed order to be recorded. The shopper may also provide payment for the final order when checking-out. In some embodiments, payment is handled automatically. In some embodiments, payment is arranged by the shopper at the kiosk.

Finally, at 520, once the order fulfilment module has finished retrieval of the items in the completed order, the items in the completed order are delivered to the shopper's vehicle. Once the items have been delivered, the shopper's vehicle may be directed out of the store.

Figure 6A:
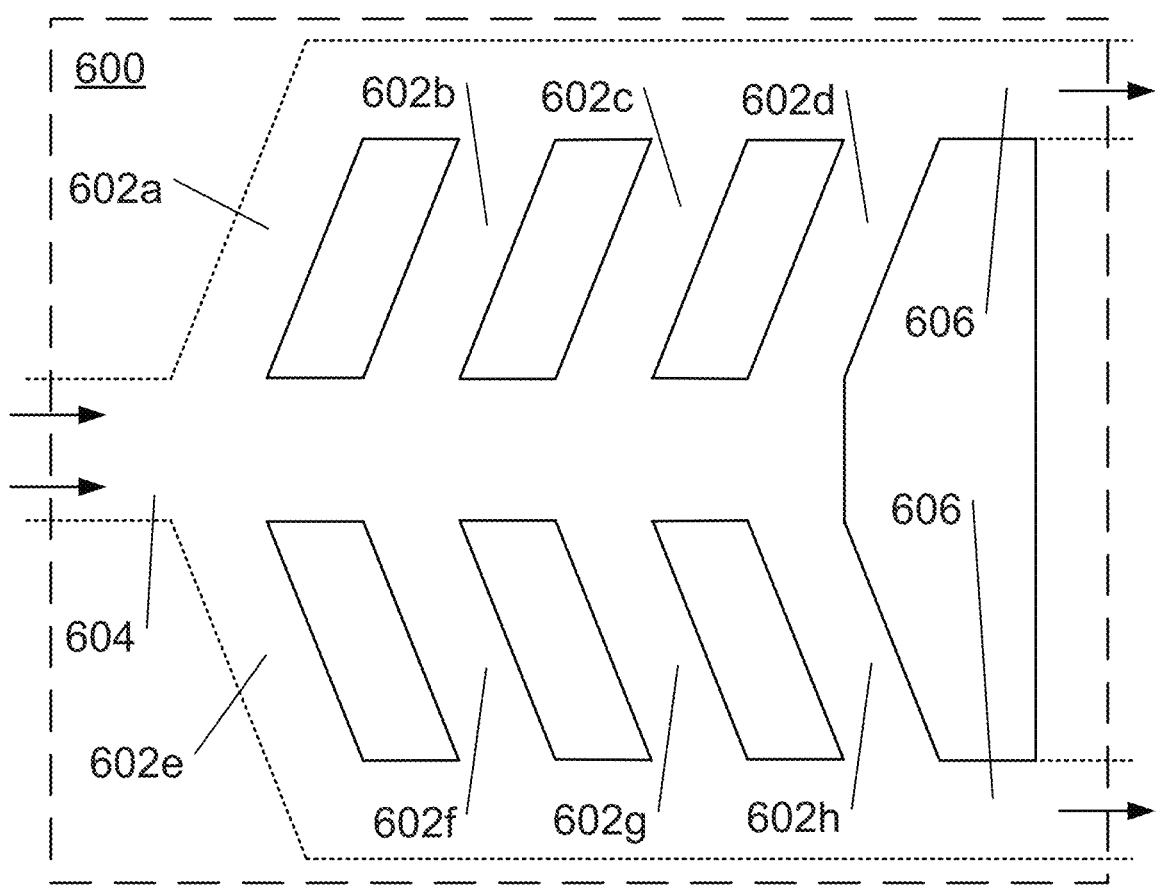
FIGS. 6A and 6B together show aspects of an example loading area for an automated drive-through store, including a pre-order loading area.
Figure 6B:
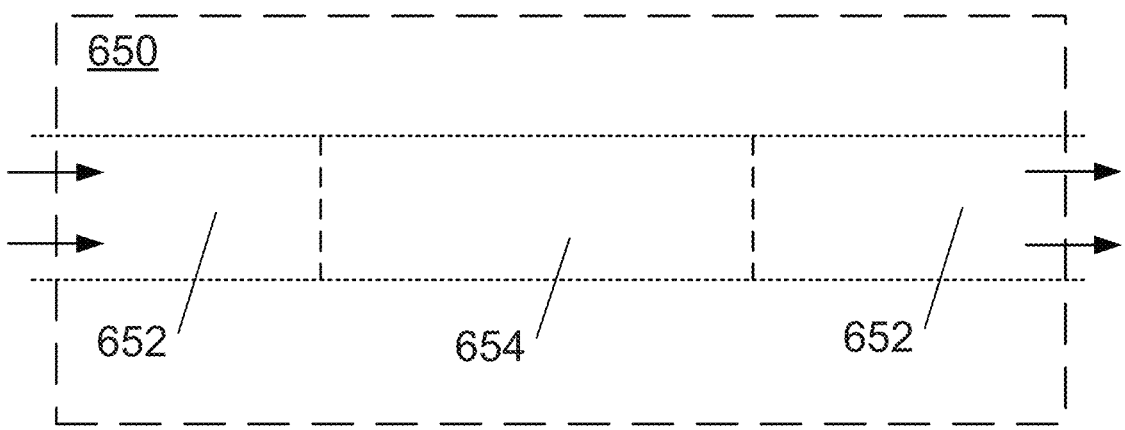

FIGS. 6A and 6B together show an example layout for a loading area of an automated drive-through store, having a dedicated pick-up area for orders made over the Internet or via an app. In the embodiment described above with reference to FIG. 1, completed orders are delivered to the shopper's vehicle at the kiosk that the shopper used for ordering. This means that a kiosk is being used while the shopper is waiting for delivery, and while the delivered items are being loaded into the shopper's vehicle. As shown in FIG. 6A, by adding a separate loading area 600 to the store, shoppers may have their completed orders delivered and loaded without preventing an ordering kiosk from being used by another shopper.

Instead of being directed to the store exit, once a shopper has completed his or her order at a kiosk and checked-out, the shopper's vehicle is directed to an open loading bay 602a-602h in the loading area 600. It should be noted that in some embodiments, each loading bay 602a-602h may be sufficiently wide to handle more than one vehicle. For stores that have a loading employee assigned to each loading bay, this may reduce the number of employees needed to handle loading the same number of vehicles.

After the shopper checks out, the shopper is assigned an open loading bay 602a-602h. Loading bay lanes 604 are then used to direct the shopper's vehicle from the exit of the item ordering area (not shown) to the assigned loading bay 602a-602h. The loading bay lanes 604 may use lights or LEDs that direct the shopper's vehicle to the assigned loading bay 602a-602h. In some embodiments, in which the shopper's vehicle is autonomous or semi-autonomous, the shopper's vehicle may receive a signal directing the vehicle to automatically navigate to the assigned loading bay 602a-602h. In some embodiments, the loading bay lanes 604 may include conveyors (not shown), such as conveyor belts, dual belt conveyor systems (such as are found in many automated car washes), or other conventional conveyor systems. In such systems, the shopper's vehicle may be shut down or placed in a "neutral" gear while the vehicle is automatically conveyed to assigned loading bay 602a-602h. As discussed above, having the vehicle shut down while being conveyed to the store exit may save fuel, reduce air pollution, reduce the need for ventilation an enclosed store area, and reduce the possibility of collisions or other accidents.

Once the shopper's vehicle has arrived at the assigned loading bay 602a-602h, the shopper may wait for the completed order to be delivered and loaded into his or her vehicle. Once this is done, exit lanes 606 direct the shopper's vehicle out of the store. As with the loading bay lanes 604, the exit lanes 606 may direct the shopper's vehicle using, e.g., lights, LEDs, a signal sent to an autonomous or semi-autonomous vehicle, a conveyor system, or other conventional systems for directing the shopper's vehicle to the store exit.

For shoppers who have already placed their order through an app or an on-line ordering system, and who do not want to change their order, it is not necessary to use the ordering area. Such shopper's vehicles may be directed immediately to the loading area 600. Alternatively, as shown in FIG. 6B, a separate pre-order loading area 650 may be used for shoppers who do not need to use an ordering kiosk.

As is discussed above with reference to FIG. 1, a shopper may be checked-in to the store through a check-in portal. Shoppers who have already entered their order, and who do not want to make any changes can then be directed to the pre-order loading area 650. Payment for the order may be made automatically, or may have been made when the shopper completed his or her order through an app or on-line ordering system. Pre-order lanes 652 may direct the shopper's vehicle to an appropriate portion of the pre-order loading area 650, such as pick up area 654. Once the shopper's order has been loaded into the shopper's vehicle, the pre-order lanes 652 can direct the shopper's vehicle to the store exit. The pre-order lanes 652 may direct the shopper's vehicle using, e.g., lights, LEDs, a signal sent to an autonomous or semi-autonomous vehicle, a conveyor system, or other conventional systems for directing or moving the shopper's vehicle.

In some embodiments, a pre-order loading area, such as is shown in FIG. 6B, may be used in a store such as the store 100, described with reference to FIG. 1. Such a store may lack a separate loading area, but could still have a separate pre-order loading area.

Figure 7:
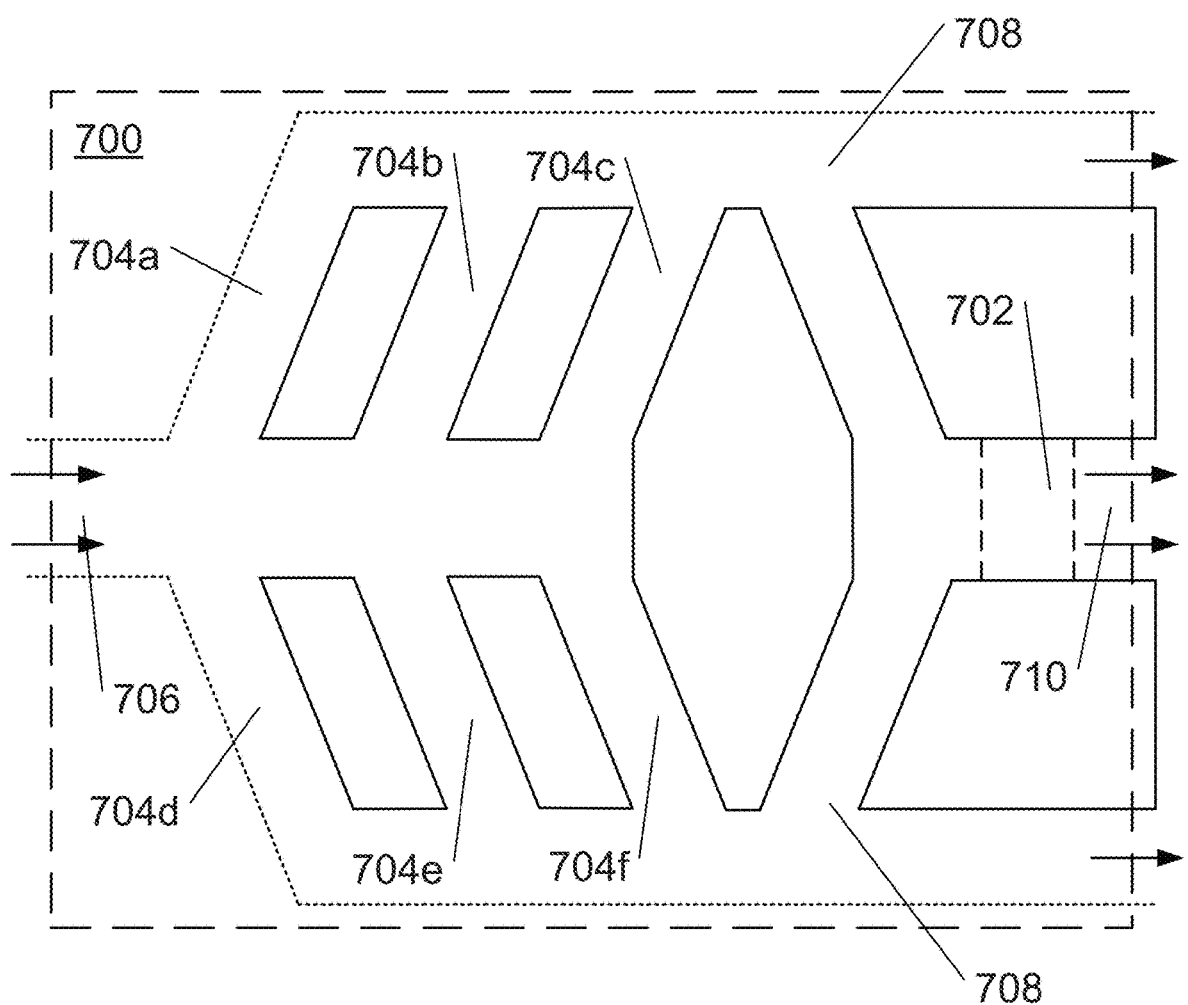
FIG. 7 shows aspects of an example loading area for an automated drive-through store, including a special loading area for large or heavy items.

FIG. 7 shows an alternative layout for a loading area 700, having a special loading area 702 for heavy or large items.

Heavy or large items may present special challenges for an automated drive-through store as described above. The "standard" automated vehicles that are used for retrieving an order may not be able to handle items that are large or heavy, necessitating special handling. This may be accomplished by using store employees (not shown) to retrieve large, heavy, or awkward items that cannot be retrieved by the "standard" automated vehicles. For the sake of safety, the large or heavy items may be kept in a separate part of the item storage area (not shown) or even in a separate item storage area (not shown), so that store employees are not in the way of the automated vehicles. In some embodiments, there may also be a set of "special" automated vehicles (not shown) that are able to retrieve large or heavy items.

Delivering such large or heavy items to a shopper's vehicle and loading them in the vehicle may also require use of systems that are not necessary for smaller items. Accordingly, the loading area 700 has a special loading area 702 that is arranged for handling special items, such as large or heavy items. The loading area 700 is similar to the loading area 600 described above with reference to FIG. 6A. The loading area 700 includes loading bays 704a-704f, loading bay lanes 706, exit lanes 708, and special lanes 710.

After completing an order in the item ordering area (not shown), when the shopper checks out, the shopper is assigned an open loading bay 704a-704f. Loading bay lanes 706 are then used to direct the shopper's vehicle from the exit of the item ordering area (not shown) to the assigned loading bay 704a-704f. The "normal" items (i.e., those that are not too large or heavy) in the completed order are delivered and loaded into the shopper's vehicle in the assigned loading bay 704a-704f. Once the items have been loaded, the shopper's vehicle is directed out of the store using exit lanes 708 if the shopper has not ordered any items that require special loading. If the shopper has ordered any items requiring special loading, such as large or heavy items (e.g., jumbo-sized packages of paper towels or toilet paper, cases of water or other beverages, etc.), then the exit lanes 708 direct the shopper's vehicle to the special loading area 702, instead of to the store exit.

Once the shopper's vehicle is in the special loading area 702, the special lanes 710 direct the shopper's vehicle to an appropriate location in the special loading area 702, and the special items, such as large or heavy items are loaded into the shopper's vehicle. The special lanes 710 then direct the shopper's vehicle to a store exit.

As with other lanes described above, the loading bay lanes 706, the exit lanes 708, and the special lanes 710 may direct the shopper's vehicle using, e.g., lights, LEDs, a signal sent to an autonomous or semi-autonomous vehicle, a conveyor system, or other conventional systems for directing or moving the shopper's vehicle.

In some embodiments, a similar arrangement could also be used for handling items such as fruit and vegetables. Such items may be too delicate to be handled by the "normal" retrieval and loading process. Additionally, for some of these items, shoppers may want to select the particular pieces of fruit or the particular vegetables that they wish to purchase, rather than leaving this to an automated system. Such special items could also be handled using a special loading area, such as the special loading area 702. In order to permit shoppers to hand-select their fruit and vegetables, store employees in the special loading areas could offer several choices of such selected item to the shopper. Alternatively, the shopper may be able to select particular items in the special loading area 702 using rotating shelves (not shown), such as are used in some vending machines, that are stocked with items from which the shopper may make a selection. If the shopper needs to change his or her order while in the special loading area 702, the special loading area 702 could be equipped with a payment kiosk (not shown), or payments and refunds could automatically be made.

In some embodiments, a special loading area, such as the special loading area 702, may be used in a store such as the store 100, described with reference to FIG. 1, for the loading of, e.g., large, heavy, awkward, delicate, or hand-pick items. Such a store may lack a separate loading area, but could still have a special loading area, such as the special loading area 702.

There is thus disclosed a store including an item ordering interface, an item storage area, a plurality of automated vehicles, and a central processing system. The item ordering interface is configured to present information on items for sale to a shopper, and to accept selections of items for purchase from the shopper. The item storage area is separate from an area containing the item ordering interface, for stocking the items for sale. The plurality of automated vehicles are configured to move within the item storage area and to retrieve items from the item storage area. The central processing system is configured to: check-in the shopper; assign an order fulfilment module to the shopper; receive selections of items for purchase from the item ordering interface in real-time, as the shopper selects the items for purchase; send the selections of items for purchase to the order fulfilment module for retrieval from the item storage area in real-time, as the shopper selects the items for purchase; check-out the shopper when the shopper is finished selecting items for purchase, a final selection of items for purchase forming a completed order; and arrange delivery of the completed order to the shopper after the order fulfilment module has finished retrieval of the items for purchase in the completed order. The order fulfilment module is configured to assign one or more of the automated vehicles to retrieve the items for purchase in real-time, as the shopper selects the items for purchase.

In another aspect, the store is a supermarket, and the items for sale comprise food items.

In another aspect, the item ordering interface includes a drive-up kiosk, and the area containing the item ordering interface includes a drive-through area.

In another aspect, the central processing system is further configured to check-in the shopper when the shopper drives a shopper's vehicle through a check-in portal.

In another aspect, the check-in portal reads a shopper identifier when the shopper drives the shopper's vehicle through the check-in portal, the shopper identifier including at least one of a vehicle license plate, a barcode, an RFID tag, a shopper loyalty card, or a biometric identifier of the shopper; and the central processing system is further configured to automatically check-in the shopper using the shopper identifier.

In another aspect, the central processing system is further configured to assign an available drive-up kiosk to the shopper when the shopper is checked-in.

In another aspect, the store further includes a ground path that directs the shopper's vehicle to the assigned drive-up kiosk.

In another aspect, the ground path includes multiple lanes.

In another aspect, the ground path includes a conveyor that moves the shopper's vehicle to the assigned drive-up kiosk while the shopper's vehicle is in a passive state.

In another aspect, the store further includes a drive-up delivery area, and the completed order is delivered to a shopper's vehicle in the drive-up delivery area.

In another aspect, the central processing system is further configured to direct the shopper's vehicle to the drive-up delivery area immediately upon check-in, if the shopper has already submitted a completed order, and does not wish to modify the completed order.

In another aspect, the drive-through area includes an outdoor area.

In another aspect, the drive-through area includes an indoor area.

In another aspect, the central processing system is configured to accept payment through an automated payment system prior to arranging delivery of the completed order.

In another aspect, the order fulfilment module is configured to assign a selected automated vehicle to the shopper when the shopper is checked-in, and to keep the selected automated vehicle assigned to the shopper until the selected automated vehicle has finished retrieval of the items for purchase in the completed order.

In another aspect, the store further includes an item database operatively connected to the item ordering interface, the item database storing information on the items for sale.

In another aspect, the item database stores information on a location within the item storage area for each item for sale, and the item database is operatively connected to at least one of the order fulfilment module or to an automated vehicle, to navigate the automated vehicle to a location of each selected item for purchase in the item storage area.

In another aspect, for each item for sale, the item database stores one or more data fields selected from the group consisting of position of the item, price of the item, weight of the item, front image of the item, lateral image of the item, back image of the item, upper image of the item, lower image of the item, barcode of the item, description of the item, nutritional facts for the item, and expiration date of the item.

In another aspect, the plurality of automated vehicles includes an in-service set of automated vehicles, and an out-of-service set of automated vehicles, and the order fulfilment module is configured to assign automated vehicles from the in-service set of automated vehicles.

In another aspect, each automated vehicle in the plurality of automated vehicles includes a battery, and each automated vehicle in the plurality of automated vehicles is configured to place itself in the out-of-service set of automated vehicles during a battery recharge operation.

In another aspect, a method of operating a drive-through store includes: checking-in a shopper when the shopper drives a shopper's vehicle through a check-in portal; assigning an available drive-up kiosk to the shopper when the shopper is checked-in; directing the shopper's vehicle to the assigned drive-up kiosk; presenting an item ordering interface on the assigned drive-up kiosk, the item ordering interface presenting information on items for sale to the shopper, and accepting selections of items for purchase from the shopper; assigning, by a central processing system, an order fulfilment module to the shopper; receiving, by the central processing system, selections of items for purchase from the item ordering interface in real-time, as the shopper selects the items for purchase; sending, by the central processing system, the selections of items for purchase to the order fulfilment module for retrieval from an item storage area in real-time, as the shopper selects the items for purchase; assigning, by the order fulfilment module, one or more automated vehicles located in the item storage area to retrieve the items for purchase in real-time, as the shopper selects the items for purchase; checking-out the shopper when the shopper is finished selecting items for purchase, a final selection of items for purchase forming a completed order; and delivering the completed order to the shopper's vehicle after the order fulfilment module has finished retrieval of the items for purchase in the completed order.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. Although the title of the invention is "DRIVE-THROUGH AUTOMATED SUPERMARKET", this title is not intended to be limiting, and instead refers to particular examples described herein. Similarly, the field of the invention and description of related art are not intended to be limiting. As discussed above, while examples relating to a drive-through supermarket are described, it will be understood that the various teachings provided herein could also be applied to other types of stores, and to stores that are not configured for drive-through use. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A store comprising:
    an item ordering interface configured to present information on items for sale to a shopper, and to accept selections of items for purchase from the shopper;
    an item storage area, separate from an area containing the item ordering interface, the item storage area stocking the items for sale;
    a plurality of automated vehicles configured to move within the item storage area and to retrieve items from the item storage area; and
    a central processing system configured to:
        check-in the shopper;

assign an order fulfilment module to the shopper;
receive selections of items for purchase from the item ordering interface in real-time, as the shopper selects the items for purchase;
send the selections of items for purchase to the order fulfilment module for retrieval from the item storage area in real-time, as the shopper selects the items for purchase;
check-out the shopper when the shopper is finished selecting items for purchase, a final selection of items for purchase forming a completed order; and
arrange delivery of the completed order to the shopper after the order fulfilment module has finished retrieval of the items for purchase in the completed order; and
a ground path including a conveyor that moves and directs the shopper's vehicle to an assigned drive-up kiosk while the shopper's vehicle is in a passive state;
wherein the order fulfilment module is configured to assign one or more of the automated vehicles to retrieve the items for purchase in real-time, as the shopper selects the items for purchase.

2. The store of claim 1, wherein the store is a supermarket, and wherein the items for sale comprise food items.

3. The store of claim 1, wherein the item ordering interface comprises the drive-up kiosk, and wherein the area containing the item ordering interface comprises a drive-through area.

4. The store of claim 3, wherein the central processing system is further configured to check-in the shopper when the shopper drives a shopper's vehicle through a check-in portal.

5. The store of claim 4, wherein the check-in portal reads a shopper identifier when the shopper drives the shopper's vehicle through the check-in portal, the shopper identifier comprising at least one of a vehicle license plate, a barcode, an RFID tag, a shopper loyalty card, or a biometric identifier of the shopper; and
wherein the central processing system is further configured to automatically check-in the shopper using the shopper identifier.

6. The store of claim 4, wherein the central processing system is further configured to assign the available drive-up kiosk to the shopper when the shopper is checked-in.

7. The store of claim 3, wherein the store further comprises a drive-up delivery area, and wherein the completed order is delivered to a shopper's vehicle in the drive-up delivery area.

8. The store of claim 7, wherein the central processing system is further configured to direct the shopper's vehicle to the drive-up delivery area immediately upon check-in, if the shopper has already submitted a completed order, and does not wish to modify the completed order.

9. The store of claim 3, wherein the drive-through area comprises an outdoor area.

10. The store of claim 3, wherein the drive-through area comprises an indoor area.

11. The store of claim 1, wherein the ground path comprises multiple lanes.

12. The store of claim 1, wherein the central processing system is configured to accept payment through an automated payment system prior to arranging delivery of the completed order.

13. The store of claim 1, wherein the order fulfilment module is configured to assign a selected automated vehicle to the shopper when the shopper is checked-in, and to keep the selected automated vehicle assigned to the shopper until the selected automated vehicle has finished retrieval of the items for purchase in the completed order.

14. The store of claim 1, further comprising an item database operatively connected to the item ordering interface, the item database storing information on the items for sale.

15. The store of claim 14, wherein the item database stores information on a location within the item storage area for each item for sale, and wherein the item database is operatively connected to at least one of the order fulfilment module or to an automated vehicle, to navigate the automated vehicle to a location of each selected item for purchase in the item storage area.

16. The store of claim 14, wherein for each item for sale, the item database stores one or more data fields selected from the group consisting of position of the item, price of the item, weight of the item, front image of the item, lateral image of the item, back image of the item, upper image of the item, lower image of the item, barcode of the item, description of the item, nutritional facts for the item, and expiration date of the item.

17. The store of claim 1, wherein the plurality of automated vehicles includes an in-service set of automated vehicles, and an out-of-service set of automated vehicles, and wherein the order fulfilment module is configured to assign automated vehicles from the in-service set of automated vehicles.

18. The store of claim 17, wherein each automated vehicle in the plurality of automated vehicles comprises a battery, and wherein each automated vehicle in the plurality of automated vehicles is configured to place itself in the out-of-service set of automated vehicles during a battery recharge operation.

19. A method of operating a drive-through store, the method comprising:
checking-in a shopper when the shopper drives a shopper's vehicle through a check-in portal;
assigning an available drive-up kiosk to the shopper when the shopper is checked-in;
directing the shopper's vehicle to the assigned drive-up kiosk via a ground path including a conveyor that moves and directs the shopper's vehicle while the shopper's vehicle is in a passive state or in response to a signal that causes the shopper's vehicle as an autonomous or semi-autonomous vehicle to navigate to the assigned drive-up kiosk;
presenting an item ordering interface on the assigned drive-up kiosk, the item ordering interface presenting information on items for sale to the shopper, and accepting selections of items for purchase from the shopper;
assigning, by a central processing system, an order fulfilment module to the shopper;
receiving, by the central processing system, selections of items for purchase from the item ordering interface in real-time, as the shopper selects the items for purchase;
sending, by the central processing system, the selections of items for purchase to the order fulfilment module for retrieval from an item storage area in real-time, as the shopper selects the items for purchase, wherein assigning one or more automated vehicles located in the storage area to retrieve the items for purchase in real-time includes assigning at least one automated vehicle to be permanently assigned to fulfilling the shopper's transaction, and at least one additional automated vehicle to be temporarily assigned to fulfilling the shopper's transaction;

assigning, by the order fulfilment module, one or more automated vehicles located in the item storage area to retrieve the items for purchase in real-time, as the shopper selects the items for purchase;

checking-out the shopper when the shopper is finished selecting items for purchase, a final selection of items for purchase forming a completed order; and delivering the completed order to the shopper's vehicle after the order fulfilment module has finished retrieval of the items for purchase in the completed order.

20. The store of claim 1, wherein the shopper's vehicle is one of an autonomous or semi-autonomous vehicle that communicates with the central processing system.

* * * * *